United States Patent Office 3,489,836
Patented Jan. 13, 1970

3,489,836
5-AMINO - 10,11-DIHYDRO - 5H - DIBENZO (a,d)-CYCLOHEPTENES AND DERIVATIVES IN PHARMACEUTICAL COMPOSITIONS AND THE USE THEREOF FOR THE TREATMENT OF EPILEPSY
Wilson Shaw Waring, Macclesfield, England, assignor to Imperial Chemical Industries Limited, London, England, a corporation of Great Britain
No Drawing. Filed Dec. 18, 1964, Ser. No. 419,588
Claims priority, application Great Britain, Jan. 6, 1964, 535/64
Int. Cl. A61k 27/00; C07d 37/24, 87/28
U.S. Cl. 424—248
9 Claims

ABSTRACT OF THE DISCLOSURE 5-amino-10,11-dihydro-5H-dibenzo (a,d)-cycloheptenes and derivatives in the treatment of epilepsy.

---

This invention relates to new pharmaceutical compositions and more particularly it relates to new pharmaceutical compositions containing amine derivatives which possess anticonvulsant properties.

Thus according to the invention we provide pharmaceutical compositions which comprise one or more amine derivatives of the formula:

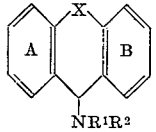

wherein X stands for the radical —$CH_2 \cdot CHR$— or —$CH=CH$—, wherein R stands for hydrogen or for an alkyl radical, wherein $R^1$ stands for hydrogen or for an alkyl radical optionally substituted by one or more hydroxy radicals and wherein $R^2$ stands for hydrogen or for an alkyl or alkenyl radical, optionally substituted by one or more hydroxy radicals, or wherein $R^1$ and $R^2$ are joined to form, together with the adjacent nitrogen atom, a heterocyclic ring, optionally substituted, and wherein ring A and/or ring B may optionally be further substituted, or a pharmaceutically-acceptable salt thereof, and a pharmaceutically-acceptable diluent or carrier therefor.

As suitable values for R, $R^1$ and $R^2$ when they stand for alkyl radicals there may be mentioned, for example, alkyl radicals of not more than 4 carbon atoms, for example methyl, ethyl, propyl, isopropyl and butyl radicals.

As suitable values for $R^1$ and $R^2$ when they stand for alkyl radicals substituted by one or more hydroxy radicals there may be mentioned, for example, hydroxyalkyl radicals of not more than 4 carbon atoms, for example β-hydroxyethyl radicals.

As a suitable value for $R^2$ when it stands for an alkenyl radical there may be mentioned, for example, the allyl radical.

As suitable values for $R^1$ and $R^2$ joined to form, together with the adjacent nitrogen atom, a heterocyclic ring there may be mentioned, for example, a 5- or 6-membered heterocyclic ring, for example a pyrrolidine, piperidine or morpholine ring, optionally substituted.

As suitable optional substituents in ring A and/or ring B there may be mentioned, for example, halogen atoms, for example fluorine, chlorine or bromine atoms, alkoxy radicals, for example alkoxy radicals of not more than 4 carbon atoms, for example methoxy and ethoxy radicals, alkyl radicals, for example alkyl radicals of not more than 4 carbon atoms, for example methyl, ethyl and t-butyl radicals and substituted alkyl radicals, for example the trifluoromethyl radical.

As suitable non-toxic pharmaceutically-acceptable salts of the said amine derivatives there may be mentioned, for example, the acid-addition salts derived from inorganic acids or organic acids, for example hydrochlorides, hydrobromides, sulphates, phosphates, acetates, citrates, oxalates, maleates and succinates.

Suitable amine derivatives for use in the compositions of the invention are, for example, 5-amino-10,11-dihydro-5H-dibenzo(a,d)-cycloheptene,
5-diethylamino-10,11-dihydro-5H-dibenzo(a,d)-cycloheptene,
5-dimethylamino-10,11-dihydro-5H-dibenzo(a,d)-cycloheptene,
5-diethylamino-5H-dibenzo(a,d)-cycloheptene,
5-dimethylamino-5H-dibenzo(a,d)-cycloheptene,
5-methylamino-10,11-dihydro-5H-dibenzo(a,d)cycloheptene,
5-ethylamino-10,11-dihydro-5H-dibenzo(a,d)cycloheptene,
5-allylamino-10,11-dihydro-5H-dibenzo(a,d)cycloheptene,
5-isopropylamino-10,11-dihydro-5H-dibenzo(a,d)cycloheptene,
5-allylamino-10,11-dihydro-5H-dibenzo(a,d)cycloheptene,
3-chloro-5-dimethylamino-10,11-dihydro-5H-dibenzo-(a,d)cycloheptene,
5-diethylamino-3-methyl-10,11-dihydro-5H-dibenzo-(a,d)cycloheptene,
5-dimethylamino-10-methyl-10,11-dihydro-5H-dibenzo (a,d)cycloheptene,
5-methylamino-5H-dibenzo(a,d)cycloheptene,
5-ethylamino-5H-dibenzo(a,d)cycloheptene,
5-propylamino-5H-dibenzo(a,d)cycloheptene,
5-isopropylamino-5H-dibenzo(a,d)cycloheptene,
5-allylamino-5H-dibenzo(a,d)cycloheptene,
5-piperidino-5H-dibenzo(a,d)cycloheptene,
5-morpholino-5H-dibenzo(a,d)cycloheptene,
5-pyrrolidino-5H-dibenzo(a,d)cycloheptene,
5-(N-β-hydroxyethyl-N-methyl)amino-5H-dibenzo(a,d) cycloheptene,
3-chloro-5-dimethylamino-5H-dibenzo(a,d)cycloheptene and
5-butylamino-3-chloro-5H-dibenzo(a,d)cycloheptene and the pharmaceutically-acceptable salts thereof.

Those of the amine derivatives which are new can be manufactured as described in our co-pending U.S. application Ser. No. 419,235, filed Dec. 17, 1964 by the interaction of a compound of the formula:

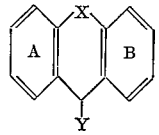

wherein X has the meaning stated above, wherein ring A and/or ring B may optionally be substituted as stated above, and wherein Y stands for a halogen atom, and an amine of the formula $HN \cdot R^1R^2$.

The pharmaceutical compositions of the invention may be in the form of tablets, capsules, aqueous or oily solutions, aqueous or oily suspensions, emulsions, sterile injectable aqueous or oily solutions or suspensions, or dispersible powders.

Suitable tablets may be formulated by admixture of one or more active ingredients with pharmaceutical excipients, for example an inert diluent, for example calcium carbonate, calcium phosphate, mannitol or lactose, a disintegrating agent, for example maize starch or alginic acid, a binding agent, for example starch, gelatin or acacia mucilage, and a lubricating agent, for example magnesium stearate, stearic acid or talc. Such tablets may optionally be coated by known techniques in order to delay disintegration in the stomach and thus to provide a sustained action over an extended period.

The aqueous suspensions of the invention generally contain a sweetening agent, for example glycerol, dextrose or sucrose, and a flavouring agent, for example vanillin or orange extract, in order to provide a palatable product. The aqueous suspensions of the invention may also contain suitable suspending or thickening agents, for example sodium carboxymethylcellulose, wetting agents, for example condensation products of fatty alcohols with ethylene oxide, and suitable preservatives, for example methyl or propyl p-hydroxy-benzoate.

The emulsion compositions of the invention may contain one or more active ingredients dissolved in a suitable fat of vegetable or animal origin, for example arachis oil or cod liver oil, and may also contain sweetening agents and flavouring agents which may with advantage be essential oils. The said emulsions may also contain emulsifying agents and dispersing agents, for example soya bean lecithin, polyoxyethylene sorbitan mono-oleate, gun acacia, gum tragacanth or casein, and preservatives, for example methyl or propyl p-hydroxybenzoate, and anti-oxidants, for example propyl gallate.

The oily solutions of the invention likewise may contain one or more active ingredients in solution in a suitable fat of vegetable or animal origin, and may optionally contain flavouring agents to mask the taste and improve oral acceptability. Such oily solutions may advantageously be filled into soft gelatin capsules. The oily solutions may also contain sweetening agents, for example icing sugar, in which case the oil phase may in addition contain a suspending agent, for example beeswax, to maintain the redispersion properties of the suspension.

Oral compositions in the form of gelatin capsules may consist of capsules containing one or more active ingredients only or the capsules may contain one or more active ingredients in admixture with one or more inert diluents, for example lactose or sorbitol.

The sterile injectable aqueous suspensions of the invention may contain a suspending or thickening agent, for example sodium carboxymethylcellulose, and a wetting or dispersing agent, for example a phenolpolyethylene oxide condensate, for example the condensation product of octylcresol with about 8-10 molecular proportions of ethylene oxide. The injectable oily solutions of the invention may be prepared from a non-toxic injectable fat or oil, for example arachis oil or ethyl oleate, and they may additionally contain gelling agents, for example aluminium stearate, to delay absorption within the body. These aqueous and oily injectable preparations may contain preservatives such as methyl or n-propyl p-hydroxybenzoate or chlorobutanol.

The pharmaceutical compositions of the invention may optionally additionally contain one or more known medicaments, for example phenobarbitone, 5,5-diphenylhydantoin or primidone.

The pharmaceutical compositions of the invention are of value in the treatment of epilepsy. Particular compositions which may be used in such treatment may be, for example, tablets containing between 50 mg. and 750 mg. of active ingredient and more particularly between 150 mg. and 500 mg. of active ingredient, or capsules containing between 100 mg. and 750 mg. of active ingredient. During treatment of epilepsy in man, the daily dosage may be, for example, of the order of 2 to 12 tablets each containing 250 mg. of active ingredient.

The invention is illustrated but not limited by the following examples in which the parts are by weight.

EXAMPLE 1

A mixture of 75 parts of 5-diethylamino-10,11-dihydro-5H-dibenzo(a,d)cycloheptene hydrochloride and 25 parts of mannitol is filled into hard gelatin capsules, containing between 100 mg. and 750 mg. of active ingredient which are then suitable for oral administration for therapeutic purposes. The 5-diethylamino - 10,11-dihydro - 5H-dibenzo(a,d)cycloheptene hydrochloride used as active ingredient may be replaced by an equal weight of the hydrochloride of 5-amino-10,11-dihydro-5H-dibenzo(a,d)cycloheptene,
5-diethylamino-5H-dibenzo(a,d)cycloheptene,
5-dimethylamino-10,11-dihydro-5H-dibenzo(a,d)cycloheptene,
5-methylamino-10,11-dihydro-5H-dibenzo(a,d)cycloheptene,
5-ethylamino-10,11-dihydro-5H-dibenzo(a,d)cycloheptene,
5-isopropylamino-10,11-dihydro-5H-dibenzo(a,d) cycloheptene,
5-allylamino-10,11-dihydro-5H-dibenzo(a,d)cycloheptene,
5-methylamino-5H-dibenzo(a,d)cycloheptene,
5-ethylamino-5H-dibenzo(a,d)cycloheptene,
5-n-propylamino-5H-dibenzo(a,d)cycloheptene,
5-isopropylamino-5H-dibenzo(a,d)cycloheptene or
5-allylamino-5H-dibenzo(a,d)cycloheptene, and there are thus obtained capsules containing between 100 mg. and 750 mg. of active ingredient which are suitable for oral administration for therapeutic purposes.

EXAMPLE 2

A mixture of 250 parts of 5-diethylamino-10,11-dihydro - 5H - dibenzo(a,d) cycloheptene hydrochloride, 125 parts of maize starch, 270 parts of calcium phosphate and 1 part of magnesium stearate is compressed, and the compressed material is then broken down into granules by passage through a 16-mesh screen. The granules so obtained are then compressed into tablets containing between 50 mg. and 750 mg. of active ingredient. The tablets thus obtained are suitable for oral use for therapeutic purposes.

The active ingredient used in the above example may be replaced by an equal weight of the hydrochloride of 5-diethylamino-5H-dibenzo(a,d)cycloheptene,
5-dimethylamino-10,11-dihydro-5H-dibenzo(a,d)cycloheptene,
5-methylamino-10,11-dihydro-5H-dibenzo(a,d)cycloheptene,
5-ethylamino-10,11-dihydro-5H-dibenzo(a,d)cycloheptene,
5-isopropylamino-10,11-dihydro-5H-dibenzo(a,d)cycloheptene,
5-allylamino-10,11-dihydro-5H-dibenzo(a,d)cycloheptene,
5-methylamino-5H-dibenzo(a,d)cycloheptene,
5-ethylamino-5H-dibenzo(a,d)cycloheptene,
5-n-propylamino-5H-dibenzo(a,d)cycloheptene,
5-isopropylamino-5H-dibenzo(a,d)cycloheptene or
5-allylamino-5H-dibenzo(a,d)cycloheptene, and there are likewise obtained tablets which are suitable for oral use for therapeutic purposes.

EXAMPLE 3

A mixture of 500 parts of 5-amino-10,11-dihydro-5H-dibenzo(a,d)cycloheptene, 94 parts of maize starch and 3 parts of magnesium stearate is compressed into slugs. The slugs are broken into granules which are then passed through an 8-mesh screen. The granules are then coated with a sufficient quantity of a solution of 15 parts of shellac and 3 parts of castor oil in 800 parts of ethyl alcohol. 3 parts of magnesium stearate are then added to the granules, which are then compressed to give tablets containing between 50 mg. and 750 mg. of active ingredient which are suitable for oral use for therapeutic purposes.

The active ingredient used in the above example may be replaced by an equal weight of 5-dimethylamino-5H-dibenzo(a,d)cycloheptene, 5 - piperidino - 5H - dibenzo(a,d)cycloheptene, 5 - pyrrolidino - 5H - dibenzo(a,d)cycloheptene or 5 - (N - β - hydroxyethyl - N - methyl)amino - 5H - dibenzo(a,d)cycloheptene, and there are likewise obtained tablets which are suitable for oral use for therapeutic purposes.

EXAMPLE 4

5 parts of 5-dimethylamino-5H-dibenzo(a,d)cycloheptene in a finely divided form are mixed with 12 parts of powdered gum acacia, 0.8 part of powdered gum tragacanth and 0.4 part of elixir of saccharin, and the whole is mixed with 50 parts of arachis oil. The oily suspension is then mixed with 50 parts of water and there is thus obtained an emulsion suitable for oral administration to man for therapeutic purposes.

The active ingredient in the above example may be replaced by an equal weight of 5-pyrrolidino-5H-dibenzo(a,d)cycloheptene or 5 - (N - β - hydroxyethyl - N - methyl)amino - 5H - dibenzo(a,d)cycloheptene, and there is likewise obtained an emulsion suitable for oral administration to man for therapeutic purposes.

EXAMPLE 5

A mixture of 40 parts of 5-pyrrolidino-5H-dibenzo(a,d)cycloheptene, 40 parts of sucrose, 0.5 part of a cetyl alcohol-polyethylene oxide condensate, 1 part of polyvinyl pyrrolidone, 0.25 part of methyl p-hydroxybenzoate and 100 parts of water is ball-milled for several hours. After the incorporation of suitable colouring and flavouring agents there is thus obtained an aqueous suspension suitable for oral administration for therapeutic purposes.

What I claim is:

1. An anticonvulsant composition in a formulated or administrable form selected from the group consisting of tablets, capsules, oily suspensions and emulsions and sterile injectable oily suspensions, said composition comprising, as the active ingredient, an anticonvulsant effective amount of at least one compound selected from the group consisting of amine derivative of the formula:

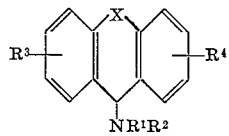

wherein X is —$CH_2CHR$— or —CH=CH—; R is hydrogen or alkyl of up to 4 carbon atoms; $R^1$ is hydrogen or alkyl of up to 4 carbon atoms; and $R^2$ is hydrogen or alkyl, hydroxyalkyl or alkenyl of up to 4 carbon atoms, or —$NR^1R^2$ is pyrrolidino, piperidino or morpholino; and $R^3$ and $R^4$ are hydrogen, halogen, alkyl of up to 4 carbon atoms, alkoxy of up to 4 carbon atoms, or trifluoromethyl; and a pharmaceutically-acceptable acid-solution salt thereof, together with a major amount of a pharmaceutically-acceptable diluent or carrier thereof.

2. A composition as claimed in claim 1 wherein the active ingredient is selected from the group consisting of
5-amino-10,11-dihydro-5H-dibenzo(a,d)cycloheptene,
5-diethylamino-10,11-dihydro-5H-dibenzo(a,d)cycloheptene,
5-dimethylamino-10,11-dihydro-5H-dibenzo(a,d)cycloheptene,
5-diethylamino-5H-dibenzo(a,d)cycloheptene,
5-dimethylamino-5H-dibenzo(a,d)cycloheptene,
5-methylamino-10,11-dihydro-5H-dibenzo(a,d)cycloheptene,
5-ethylamino-10,11-dihydro-5H-dibenzo(a,d)cycloheptene,
5-propylamino-10,11-dihydro-5H-dibenzo(a,d)cycloheptene,
5-isopropylamino-10,11-dihydro-5H-dibenzo(a,d)cycloheptene,
5-allylamino-10,11-dihydro-5H-dibenzo(a,d)cycloheptene,
3-chloro-5-dimethylamino-10,11-dihydro-5H-dibenzo(a,d)cycloheptene,
5-diethylamino-3-methyl-10,11-dihydro-5H-dibenzo(a,d)cycloheptene,
5-dimethylamino-10-methyl-10,11-dihydro-5H-dibenzo(a,d)cycloheptene,
5-methylamino-5H-dibenzo(a,d)cycloheptene,
5-ethylamino-5H-dibenzo(a,d)cycloheptene,
5-propylamino-5H-dibenzo(a,d)cycloheptene,
5-isopropylamino-5H-dibenzo(a,d)cycloheptene,
5-allylamino-5H-dibenzo(a,d)cycloheptene,
5-piperidino-5H-dibenzo(a,d)cycloheptene,
5-morpholino-5H-dibenzo(a,d)cycloheptene,
5-pyrrolidino-5H-dibenzo(a,d)cycloheptene,
5-(N-β-hydroxyethyl-N-methyl)amino-5H-dibenzo(a,d)cycloheptene,
3-chloro-5-dimethylamino-5H-dibenzo(a,d)cycloheptene and
5-butylamino-3-chloro-5H-dibenzo(a,d)cycloheptene and the pharmaceutically-acceptable salts thereof.

3. A composition as claimed in claim 1 which is in unit dosage form and which is a tablet containing between 50 mg. and 750 mg. of active ingredient.

4. A composition as claimed in claim 1 which is in unit dosage form and which is a capsule containing between 100 mg. and 750 mg. of active ingredient.

5. A composition as claimed in claim 1 wherein R is hydrogen or methyl; $R^1$ is hydrogen, methyl or ethyl and $R^2$ is hydrogen, methyl, ethyl, n-propyl, isopropyl, n-butyl, β-hydroxyethyl or allyl, or —$NR^1R^2$ is pyrrolidino, piperidino or morpholino; $R^3$ is hydrogen, flourine, chlorine, bromine, methyl, ethyl, t-butyl, methoxy, ethoxy or trifluoromethyl; and $R^4$ is hydrogen.

6. A composition as claimed in claim 1 wherein X is —$CH_2CH_2$— or —CH=CH—, $R^1$ and $R^2$ are both methyl or both ethyl, and $R^3$ and $R^4$ are both hydrogen.

7. A composition as claimed in claim 1 wherein X is —$CH_2CH_2$— or —CH=CH—, $R^1$ is hydrogen and $R^2$ is methyl or ethyl, and $R^3$ and $R^4$ are both hydrogen.

8. A composition as claimed in claim 1 which additionally contains at least one known medicament selected from the group consisting of phenobarbitone, 5,5-diphenylhydantoin and primidone.

9. Process for the treatment of epilepsy in man which comprises administering to said man an effective amount of at least one compound selected from the group consisting of amine derivatives of the formula:

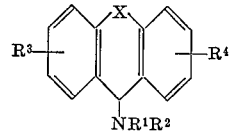

wherein X is —$CH_2CHR$— or —$CH_1$=CH—; R is hydrogen or alkyl of up to 4 carbon atoms; $R^1$ is hydrogen or alkyl of up to 4 carbon atoms; and $R^2$ is hydrogen or alkyl, hydroxyalkyl or alkenyl of up to 4 carbon atoms, or —$NR^1R^2$ is pyrrolidino, piperidino or morpholino; and $R^3$ and $R^4$ are hydrogen, halogen, alkyl of up to 4 carbon atoms, alkoxy of up to 4 carbon atoms, or trifluoro methyl; and the pharmaceutically-acceptable acid-addition salts thereof.

References Cited

UNITED STATES PATENTS 3,052,721  9/1962  Bernstein _____ 260—570.8
3,258,488  6/1966  Judd _____ 260—570.8

ALBERT T. MEYERS, Primary Examiner
S. J. FRIEDMAN, Assistant Examiner

U.S. Cl. X.R.

260—293, 326, 570.8, 573, 576, 578, 247; 424—274, 267, 330